(12) United States Patent
Saito

(10) Patent No.: US 6,567,862 B1
(45) Date of Patent: May 20, 2003

(54) DATA STORAGE APPARATUS AND ACCESS METHOD THEREOF

(75) Inventor: Kenji Saito, Kantano (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/462,905

(22) PCT Filed: May 19, 1999

(86) PCT No.: PCT/JP99/02597

§ 371 (c)(1),
(2), (4) Date: Jan. 18, 2000

(87) PCT Pub. No.: WO99/60472

PCT Pub. Date: Nov. 25, 1999

(30) Foreign Application Priority Data

May 19, 1998 (JP) .......................... 10-153992

(51) Int. Cl.[7] .............................................. G06F 13/14
(52) U.S. Cl. .......................... 710/5; 710/129; 711/158; 711/167
(58) Field of Search ..................... 710/5, 129; 711/158, 711/167

(56) References Cited

U.S. PATENT DOCUMENTS 5,729,718 A * 3/1998 Au .............................. 711/167
5,740,465 A * 4/1998 Matsunami et al. ............ 710/5
6,170,042 B1 * 1/2001 Gaertner et al. ............ 711/158

FOREIGN PATENT DOCUMENTS

| EP | 0 491 463 | 6/1992 |
| JP | 3-252832 | 11/1991 |
| JP | 6-12328 | 1/1994 |

* cited by examiner

Primary Examiner—Jeffrey Gaffin
Assistant Examiner—Abdelmoniem Elamin
(74) Attorney, Agent, or Firm—Wenderoth, Lind & Ponack, L.L.P.

(57) ABSTRACT

A data storage apparatus for storing data to a hard disk or other data recording medium improves data read/write efficiency is provided. The data storage apparatus receives read/write commands over a network from a plurality of terminals connected to the network. The apparatus groups received commands according to an area on the data recording medium accessed by each command, stores the received commands to one of predetermined command group areas in a memory according to the group, selects at every predetermined time one of those command areas and then executes at least one of commands stored in the selected command area.

10 Claims, 17 Drawing Sheets

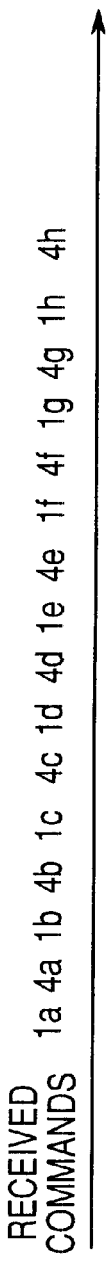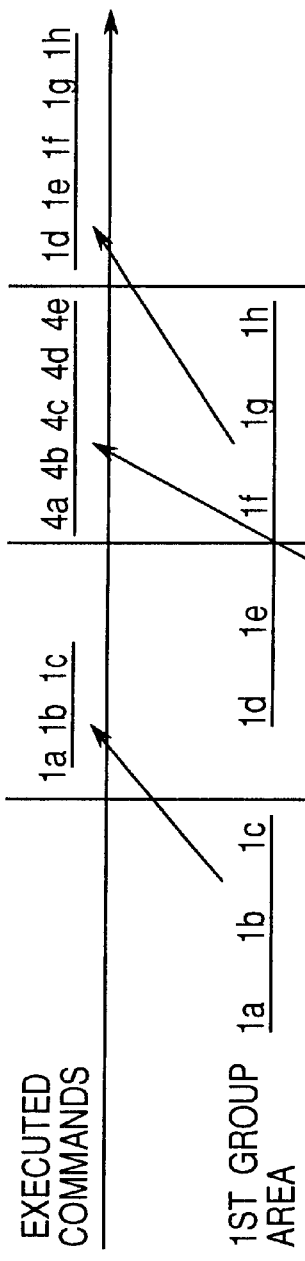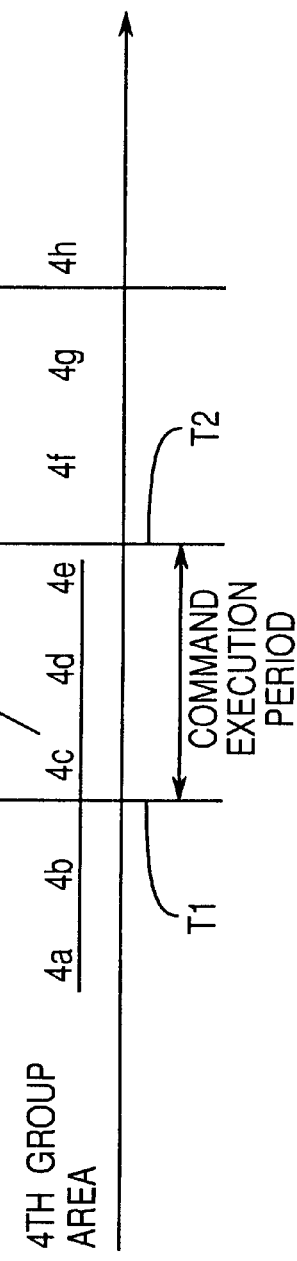

DATA STORAGE APPARATUS AND ACCESS METHOD THEREOF

TECHNICAL FIELD

The present invention relates to a data storage apparatus storing data, more specifically to an apparatus which writes/reads data to/from data recording medium such as a magnetic disk according to write/read commands received over a network from a plurality of computers or peripheral devices connected to the network.

BACKGROUND ART

A hard disk device and other data recording devices as data storage devices used for reading/writing information to/from a data recording medium are typically connected to a computer or other terminal device, and read/write information by executing commands received from the computer. Recording to or reading from the hard disk device is performed by communicating commands with data. The commands comprise a write or read instruction, the position from which the read/write operation begins (the address), and data size to read or write. They instruct the disk drive what to do. Each command also has a command identifier (such as an ID number) for identifying the command.

When a write command is issued, the hard disk device receives the information to be written (write data), and performs a write operation for writing information with the specified data size to the recording medium from the specified start address. When a read command is issued, the hard disk device reads data with the specified data size from the specified start address, and sends the read data to the computer. A plurality of commands each having an identifier can be received before processing a previously received command is completed. This is because the same number assigned to a command is assigned to the data associated with that command. As a result, commands and data will not be confused.

Write and read operations to a hard disk (recording medium) are referred to as disk "access" operations. Both sequential access and random access operations are possible.

In the sequential access, the addresses of successive access operations are in substantially consecutive sequence such that the end of a first accessed data block and the start of the next accessed data block are consecutive. Movement of a recording head of the device from the end of the first access block to the start of the next access address is small, that is the time required for the head to move from the end address to the start address (the seek time) is short. Therefore, the amount of data that can be read or written in a predetermined period (the data throughput or transfer volume) is great.

With the random access, however, there is no relationship between addresses of consecutive access operations, and the recording head may need to move a great distance. The seek time in random access operations is therefore on average longer than that in sequential access operations, and data throughput per unit time is therefore less.

Hard disk devices can also be connected to a network and accessed from a plurality of computers. This type of hard disk device system is known as "a data server". When a plurality of users separately access information on a single magnetic disk device (data server), the disk is accessed by a random access operation, and data throughput therefore drops.

This type of data server is increasingly used for storing and retrieving audio-video (AV) data. While computer data can be read out and correctly reproduced even when there are delays in data access, that is, data reproduction is not time dependent, natural reproduction of audio and video information requires a specific (large) amount of data to be read within a specific limited amount of time. AV information is thus time-dependent. As a result, when AV data is randomly stored and read from multiple computers, data transfer may not proceed smoothly.

DISCLOSURE OF INVENTION

With consideration for the above mentioned problems, it is therefore an object of the present invention to improve the efficiency of data reading and writing in a data storage apparatus having a magnetic disk or other internal recording medium from/to which it reads/writes information.

In one aspect of the invention, a data storage apparatus for storing data to a data recording medium is provided. The apparatus receives commands through a communication device from external devices, records to the data recording medium data received with a command when the received command is a write command, and when the received command is a read command, reads information from the data recording medium according to the read command and outputs the data through the communication device.

The apparatus comprises a command storing device and a command executing device. The command storing device groups received commands according to a recording area on the data recording medium accessed by each command, and stores the received commands to a predetermined command group area according to the group. The command executing device selects, at a predetermined time interval, one of the command group areas in the command storing device, and executes at least one of commands stored in the selected command group area. The data recording medium may be a magnetic disk.

In the apparatus, the command executing device may select the command group area storing the most number of unexecuted commands, as the one selected command group area at a specific time interval. The command executing device may also select one of the command group areas in the command storing device in the predetermined sequence.

The command executing device may comprise a detection device and a command predicting device. The detection device detects whether data specified by a plurality of read commands is stored to sequential recording areas on the data recording medium when commands stored to the selected command group area are read commands. The command predicting device predicts a command for reading out data from a data recording area on the data recording medium when the detection device determines that sequential recording areas are accessed by the read commands, where the data recording area being sequential to areas accessed by commands stored in the selected command group area. Then the predicted command is processed consecutively to commands contained in the selected command group area.

In a second aspect of the invention, a method is provided for controlling a data storage apparatus for storing data to a data recording medium. The apparatus receives commands through a communication device from external devices, and records to the data recording medium data received with a command when the received command is a write command, and when the received command is a read command, reads information from the data recording medium according to the read command and outputs the data through the communication device.

The method comprises the steps of grouping received commands according to a recording area on the data recording medium accessed by each command; storing the received commands to a predetermined command group area according to the group; selecting at a predetermined time interval one of the command group areas; and executing at least one of commands stored in said selected command group area.

An apparatus according to the present invention processes received commands not in the order received, but in groups of commands grouped by the area on the data storage medium accessed by each command. Access to the recording area of the recording medium by a plurality of commands within a predetermined time period is therefore restricted to a limited area of the disk. Read/write head movement when accessing the data recording area is therefore reduced, and the amount of data read or written to disk within a specific unit of time can therefore be increased.

In addition, when data stored to sequential addresses in the recording area of the data recording medium is accessed, access commands that have still not been received can be predicted from the address contiguity of received commands and processed before the actual command is received. As a result, head travel can be further reduced, and data throughput can be further improved.

Other objects and goals together with a fuller understanding of the invention will become apparent and appreciated by referring to the following description and claims taken in conjunction with the accompanying drawings.

BRIEF DESCRIPTION OF DRAWINGS

FIGS. 6A–6F are diagrams which describe the sequence in which received commands are processed by the data server system according to the first preferred embodiment.

BEST MODE FOR CARRYING OUT THE INVENTION

The preferred embodiments of the present invention are described below with reference to the accompanying figures.

The data server system as a data storage apparatus described below receives commands, groups the received commands according to area on the recording medium to which the received commands access, stores the received commands to command group areas in a memory according to the access area of received command, and executes the stored commands in one of the command group areas in batches at a predetermined time interval. This allows movement of a recording head of the data server to be reduced, and therefore the efficiency of disk access could be improved.

EMBODIMENT 1

Figure 1:
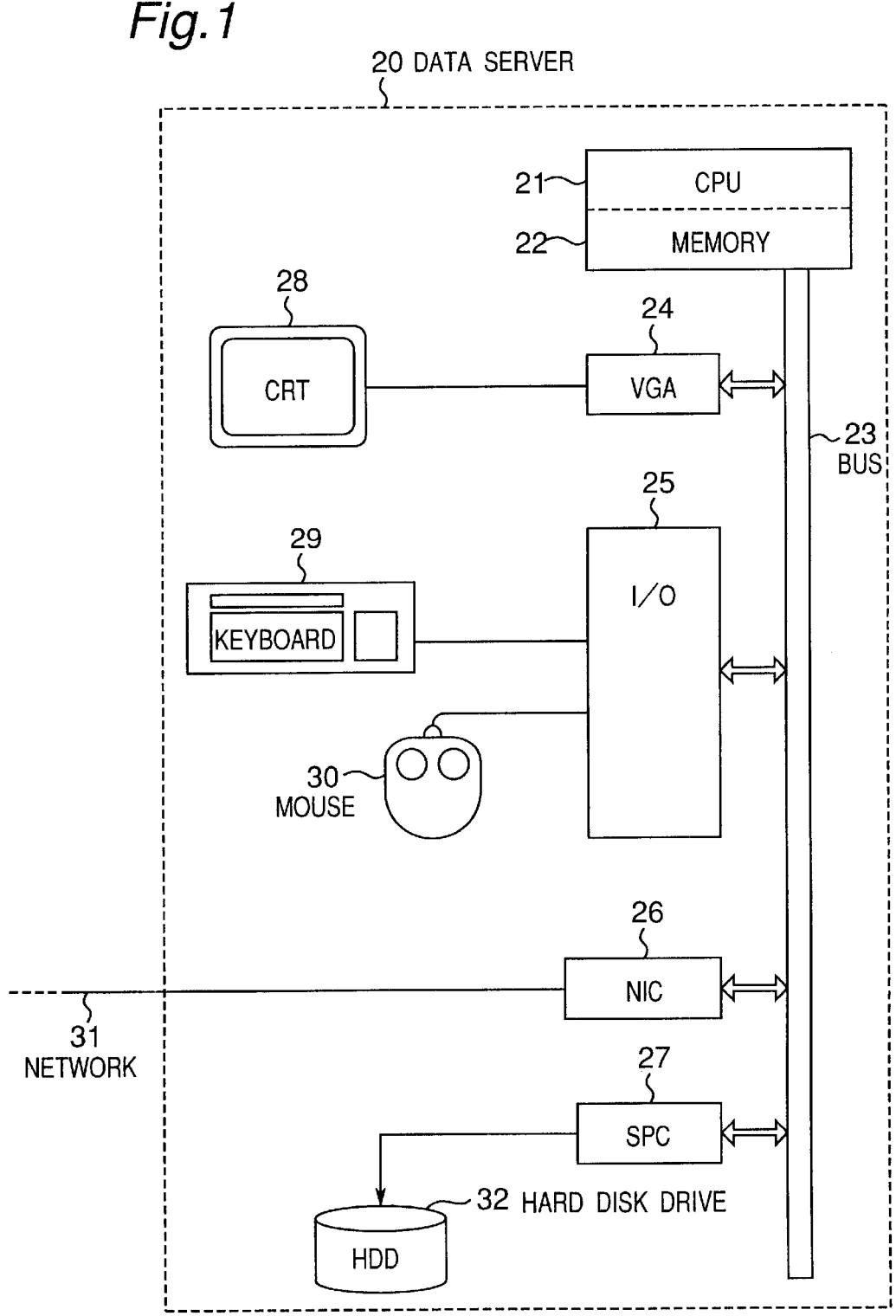
FIG. 1 is a block diagram of a data server system as a data storage apparatus according to a first preferred embodiment of the present invention.

FIG. 1 is a block diagram of an exemplary data server system which is implemented as a hard disk device according to a first preferred embodiment of the present invention. As shown in FIG. 1, this data server system 20 comprises a CPU 21, a memory 22, a bus 23, VGA interface 24, an input/output (I/O) interface 25, a network interface card (NIC) 26, a display 28 such as a CRT monitor, a keyboard 29, mouse 30, and a hard disk drive (HDD) 32.

The CPU 21 runs a program stored, for example, in memory 22. The memory 22 temporarily stores both data and programs (applications). The bus 23 carries information between the various devices connected to each other by way of the bus 23. The display 28 presents both textual and graphic information to a user after the information to be displayed is processed for display by the VGA interface 24. A user enters information and commands with the keyboard 29, mouse 30, or other data entry means. The data entry means are connected to the bus 23 through I/O interface 25.

The hard disk drive 32 typically contains, as a data recording medium, a hard disk or a disk-shaped medium coated with a magnetically sensitive material for recording information. The hard disk drive 32 is typically connected to the bus 23 by way of a protocol controller 27 such as a SCSI Protocol Controller (SPC). The server 20 connects to the network 31 via the network interface card (NIC) 26.

In a data server system 20 thus comprised, the network interface card 26 and the network 31 provide a device for communicating with devices external to the data server system 20. In addition, memory 22 provides a device for storing a plurality of read and write commands. A device for detecting from the plurality of commands in memory 22 those commands that access information from consecutive storage addresses on disk, and a device for predicting and adding a read command continuing from the end of a continuous data stream specified by a read command, can be achieved in software run by the CPU 21.

Figure 2:
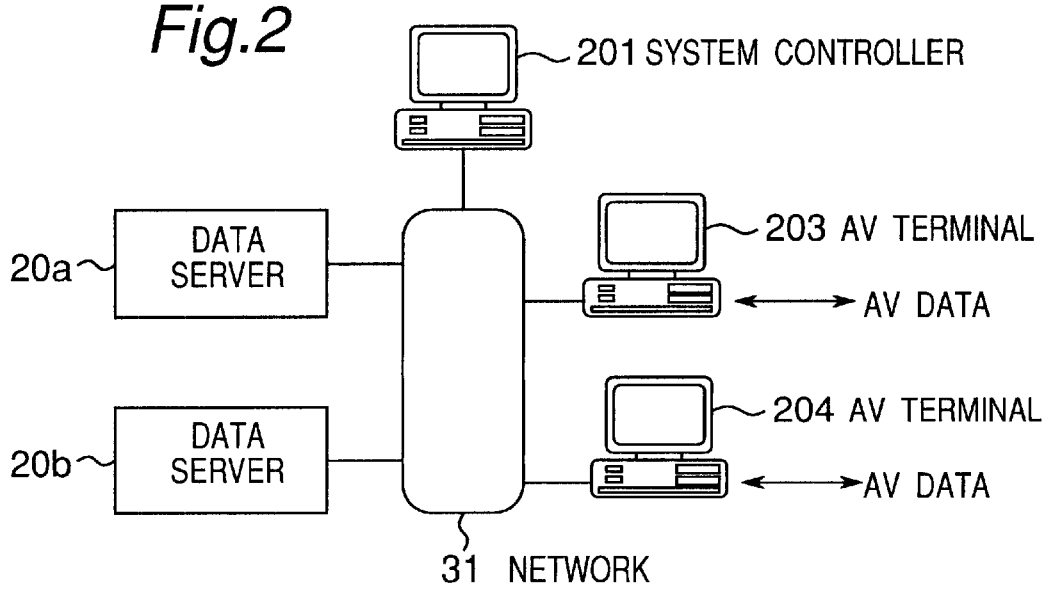
FIG. 2 is a schematic diagram of the data server system shown in FIG. 1 connected to a network.

FIG. 2 shows an exemplary system in which the data server system shown in FIG. 1 is used. As shown in FIG. 2, data server systems 20*a* and 20*b* are connected to network 31, to which a system controller 201 and AV terminals 203 and 204 are also connected. The system controller 201 manages information stored to data server systems 20*a* and 20*b*. Using AV terminal 203 or 204, a user records or reproduces audio and visual (AV) information to and from the data server systems 20*a* and 20*b*.

To record AV information, the AV information is input to the AV input terminal of AV terminal 203, for example, and a start recording operation is performed. The AV terminal 203 obtains address information for an amount of data that can be recorded to data server systems 20*a* and 20*b* within a predetermined period of time. In this exemplary embodiment this period of time is 5 seconds. The address information is obtained from the system controller 201. The AV terminal 203 then compresses the AV information, and sends the AV information with a write command to the data server systems 20*a* and 20*b*. Before completion of recording this 5 second equivalent amount of data, the AV terminal 203 polls the system controller 201 to obtain address information for the next 5 seconds of data, and continues the recording operation. The system controller 201 stores the title and recording area of the written AV information.

To read information from the data server systems 20*a* and 20*b*, the AV terminal 203 polls the system controller 201 for the AV information to be read or reproduced, and obtains from the system controller 201 the address information for an amount of information that can be reproduced in a predetermined period of time (which is 5 seconds in this exemplary embodiment). The AV terminal 203 then sends a read command to the data server systems 20*a* and 20*b*, expands the compressed read information, and then outputs and/or presents the information to the user. As during the write operation, the AV terminal 203 successively polls the system controller 201 for the next address information needed to continue uninterrupted reproduction.

It should be noted that one unit of AV information is distributively stored to two data server systems in this embodiment. The data server systems 20*a* and 20*b* thus operate in parallel, increasing data throughput per unit time. As also described above, write or read command is sent to the data server systems 20*a* and 20*b* from the AV terminal 203, specifying the disk write or read address.

A command received by the data server system 20 is described next below. Commands to a hard disk drive 32 typically include a default setting command, write command, read command, setup command, disk error handling command, and so on. The write command and the read command in particular are further described below.

A write command comprises a code indicating a write operation is to be performed, address information indicating a location on disk, and the data size indicating the amount of information to be written. The data to be written then follows the write command.

A read command comprises a code indicating a read operation is to be performed, address information indicating a location on disk, and the data size indicating the amount of information to be read. The data read from disk is then returned to the terminal sending the read command. The same unique identifier (tag) is appended both to the read command and the data read in response to the read command. This tag makes it possible to determine what data belongs to what read command when a plurality of commands are received and processed. This method of associating data with a command is commonly referred to as "command queuing" or "tagging" method. The present embodiment requires an operating environment using such a tagging method so that a plurality of commands can be consecutively issued.

Figure 3A:
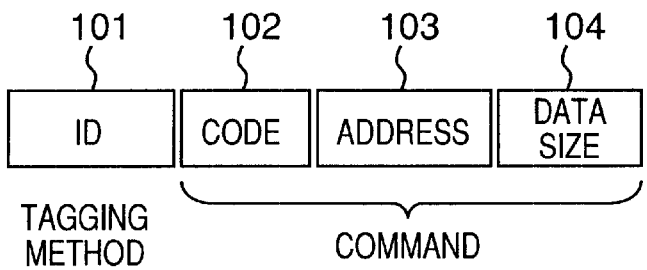
FIG. 3A is a diagram that describes an exemplary structure of a received command.
Figure 3B:
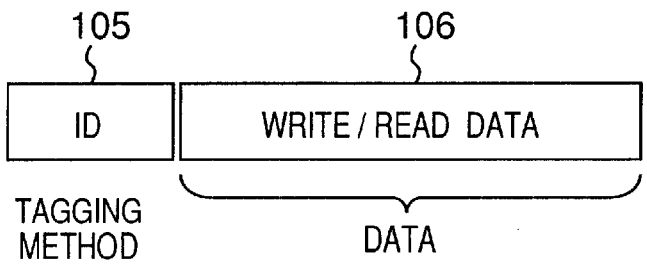
FIG. 3B is a diagram that describes an exemplary structure of write/read data.

FIG. 3A is a map of an exemplary command structure. In this example a unique identifier is assigned to each command according to the above-noted tagging method so that a plurality of commands can be issued before processing any single command is completed. As shown in FIG. 3A, a unique identifier 101 is assigned to each command. The command includes a code 102 identifying whether the command is a read or write command; an address 103 indicating the starting point for the read or write operation; and a data size 104 indicating the amount of data transferred by the command. FIG. 3B shows the data corresponding to a read/write command. The identifier 105 is assigned the same value written to the identifier 101 for the command, and the read/write data 106, that is, the data to be written if the command is a write command, or the data returned in response to a read command.

Figure 4:
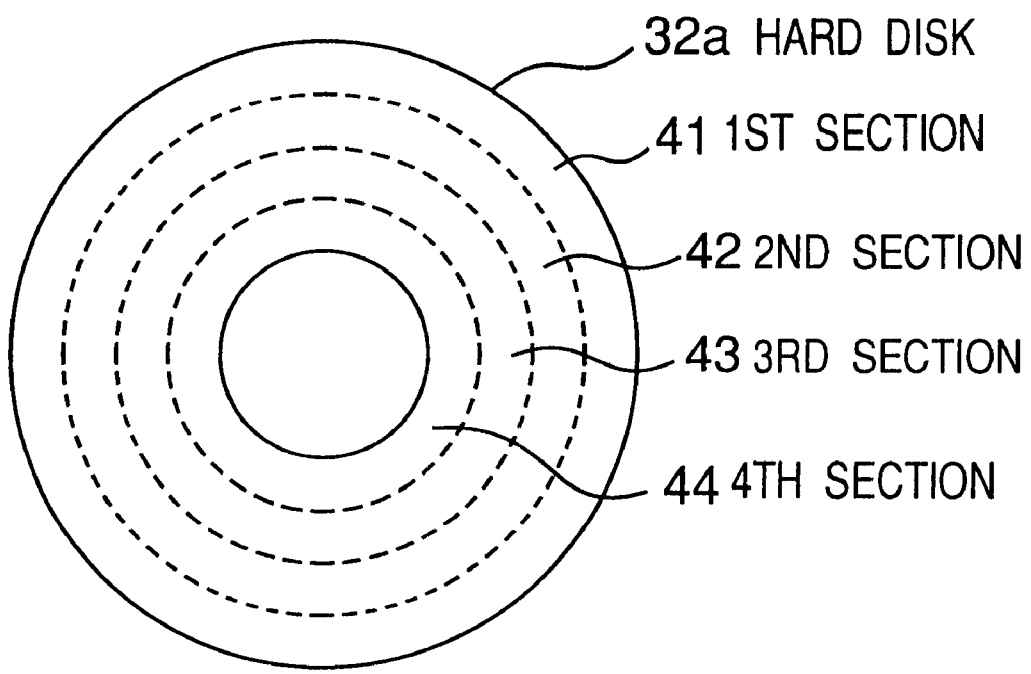
FIG. 4 is a diagram that shows the segmentation of the recording area of a magnetic disk used in the data server system according to the first preferred embodiment.

In order to access the hard disk drive 32, the data server system 20 as shown in FIG. 1 segments the recordable area of the disk into a predetermined number of areas. For simplicity in the following description, as shown in FIG. 4, the recording area of disk 32*a* of the hard disk drive 32 is divided into four sections, referred to below as first section 41, second section 42, third section 43, and fourth section 44. When the data server system 20 receives a command from an AV terminal 203 via the network 31, it determines which section 41, 42, 43 or 44 is accessed by the received command, groups the commands based on the determined section 41, 42, 43 or 44 for the command, and then stores the received command to corresponding specific areas in memory 22 according to the section to be accessed. Commands stored by recording section group to memory 22 are then executed by group (memory area). For this purpose, the memory 22 has some areas for storing received commands corresponding to the sections 41–44 on the hard disk.

Figure 5:
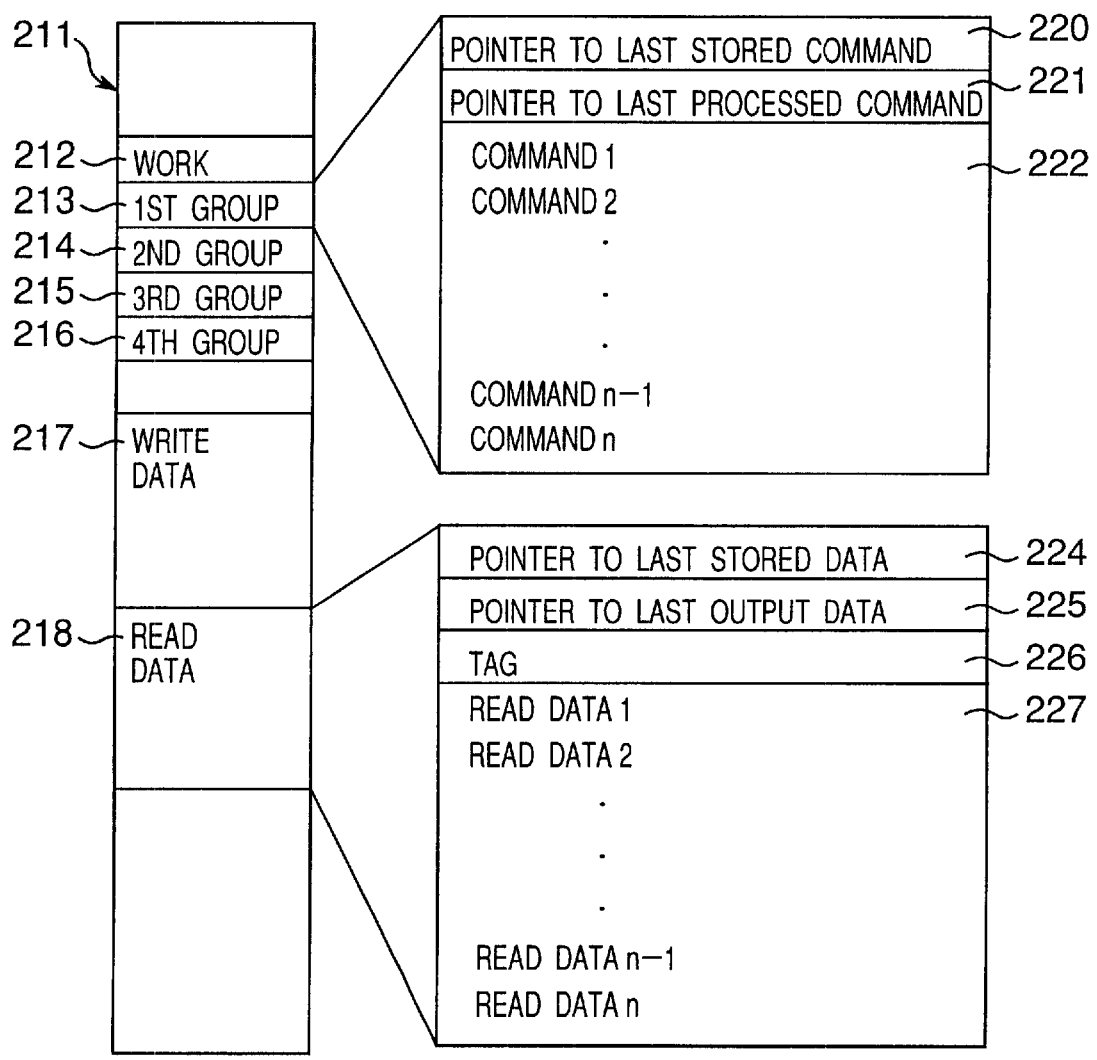
FIG. 5 is a map of the memory space of memory used in the data server system according to the first preferred embodiment.

FIG. 5 is a memory map for memory 22. Area 212 in memory space 211 is a working area for storing predetermined information required for hard disk drive operations.

Areas 213–216 correspond to sections 41–44 on hard disk drive 32. More specifically, the area (first group area) 213 stores a group of received commands that access the first section 41 on the hard (magnetic) disk 32*a*; the area (second group area) 214 stores a group of received commands that access the second section 42; the area (third group area) 215 stores a group of received commands that access the third section 43; and the area (fourth group area) 216 stores a group of received commands that access the fourth section 44.

Each of areas 213–216 is further divided into a plurality of segments 220–222. Received commands are stored in the sequence received to area 222. Area 222 thus requires an area equivalent to 12×n bytes where n is the maximum number of commands that can be stored to area 222, and each command is 12 bytes long. Area 220 stores a pointer to the storage position (address) of the last command written to area 222. Area 221 stores a pointer to the storage position (address) of the last command in area 222 that was processed. If the same pointers are stored in area 220 and area 221, all commands stored to area 222 have been processed or executed. That is, it is possible to determine whether all commands stored to each of the areas 213 to 216 have been processed.

A write data area 217 for storing the information (write data) corresponding to a received write command is also provided in memory space 211. Likewise, a read data area 218 for storing the data (read data) read from hard disk drive 32 in response to a received read command is also provided in memory space 211. In addition, the read data area 218 is further divided into a plurality of segments 224 to 227.

Area 227 stores the read data in the sequence where the data is read. Area 224 stores a pointer to the address of the last read data. Area 225 stores a pointer to the address of the read data in area 227 that was output or transferred last. Area 226 stores the tag information including a plurality of tags, each of which relates the command with the data read out by the command. Area 226 thus requires a 2×n bytes space where n is the number of tags stored, and each tag is 2 bytes. A tag is assigned to each block of read data stored to area 227 such that, for example, the first two-byte of tag information indicates "read data 1," the next 2-byte of tag information indicates "read data 2," the next 2-byte indicates read data 3, and so forth to read data n. If one read data block is, for example, 64 KB (e.g., read data 1 is 64 KB long), area 227 requires 64×n KB.

When a command is received from an AV terminal connected to the network 31, the data server system groups the received commands according to the area of hard disk drive 32 accessed by each command as described above, and temporarily stores the commands to a particular area in the memory 22 as also noted above. At a predetermined time ("command execution time"), commands stored to memory 22 are run in batches of commands all addressing the same area on hard disk drive 32. By thus batch executing commands accessing the same disk area, the distance the head travels over the hard disk drive 32 can be reduced.

FIGS. 6A–6F shows the sequence in which received commands are run by a data server system of the present invention. The received commands are shown in FIG. 6A where the commands are indicated as command 1a, 4a, 1b, 4b, 1c, and so forth. Note that the number of each command shown here indicates the storage section (first to fourth sections) accessed by the command, and the following letter indicates the sequence in which the command for a particular area was received. Therefore, for example, command "1a" is the first command received for accessing the first section 41, and is stored to the corresponding group area in the memory.

When commands are received in the sequence shown in FIG. 6A, they are classified according to the sections 41–44 of the hard disk 32a accessed by each command, and are stored to the corresponding areas 213–216 in the memory 22 (see FIGS. 6c–6F). That is, commands 1a, 1b, 1c . . . are sequentially stored to the first group area 213, and commands 4a, 4b, 4c are sequentially stored to the fourth group area 216. Thereafter at each command execution time, one of areas 213–216 in the memory 22 is selected, and all unexecuted commands stored to the selected area are executed (see FIG. 6B).

Various methods can be used for selecting the group area from which to read the commands to run. For example, the area with the most commands waiting to be executed could be selected; the areas could be selected in a predetermined sequence; or the area could be selected, which correspondes to the disk section outside of the disk section having commands being processed immediately before. In the example shown in FIG. 6, the group area containing the most unprocessed commands at each command execution time T1, T2, and so forth is selected and the commands are run. In this way, all commands accessing a particular disk section that have been received but not executed at a particular command execution time are processed. This reduces head travel involved for read commands, and thereby increases data throughput.

Figure 7:
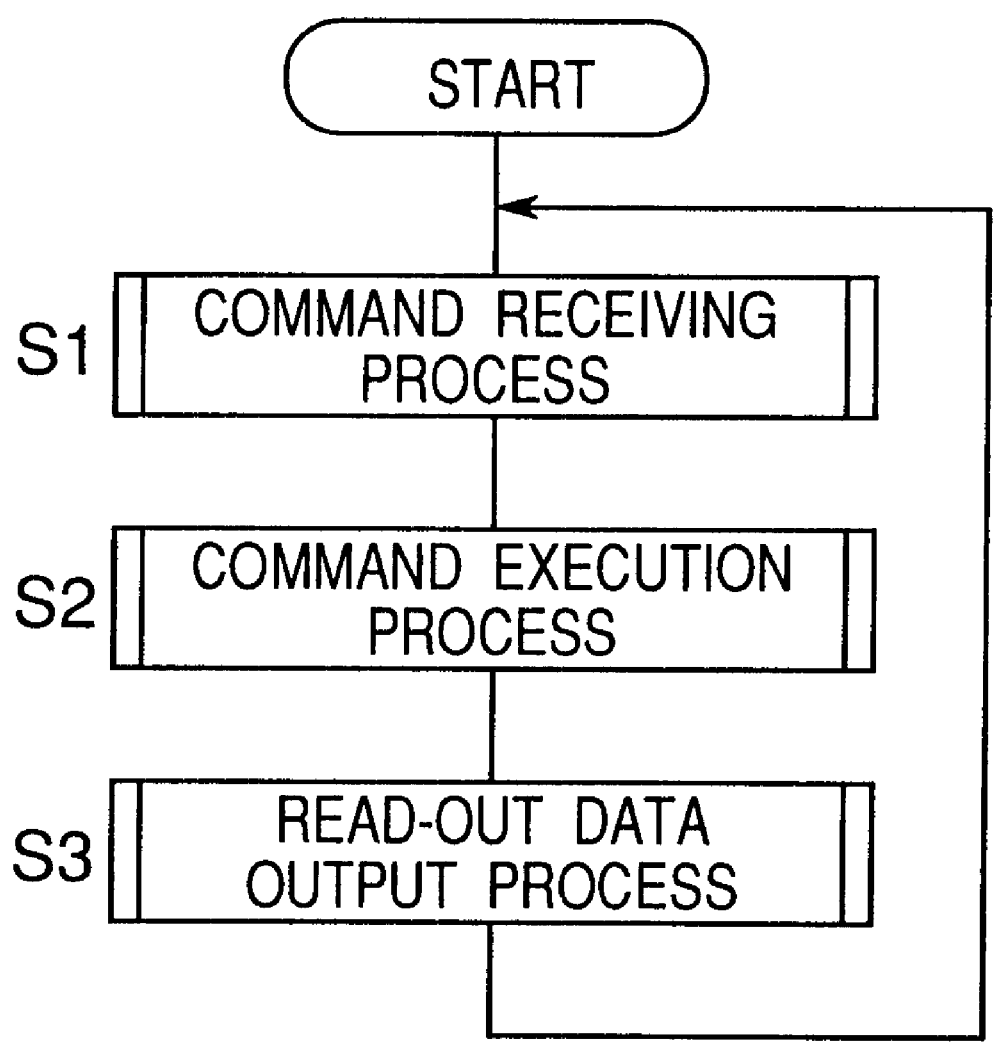
FIG. 7 is a flow chart of the main routine of the 20 data server system according to the first preferred embodiment.

The operation of a data server system according to this preferred embodiment is described next below with reference to the accompanying flow charts. FIG. 7 is a flow chart of the main process of the data server system. This main process can be achieved by the CPU 21 of the data server system's running a specific application program. As shown in FIG. 7, the data server system 20 repeatedly performs a command receiving process (S1), a command execution process (S2), and a read-out data output process (S3).

The command receiving process S1 groups the received commands based on the disk section accessed by the commands, and then stores the commands as described above.

The command execution process (S2) runs all commands accessing the same disk section that have still not been run at a particular command execution time. The read-out data output process (S3) outputs or transfers the data read in response to a particular read command to the terminal from which the command was received. It should be noted that this main process can be terminated by applying a specific interrupt signal. These processes are described in further detail below.

Figure 8:
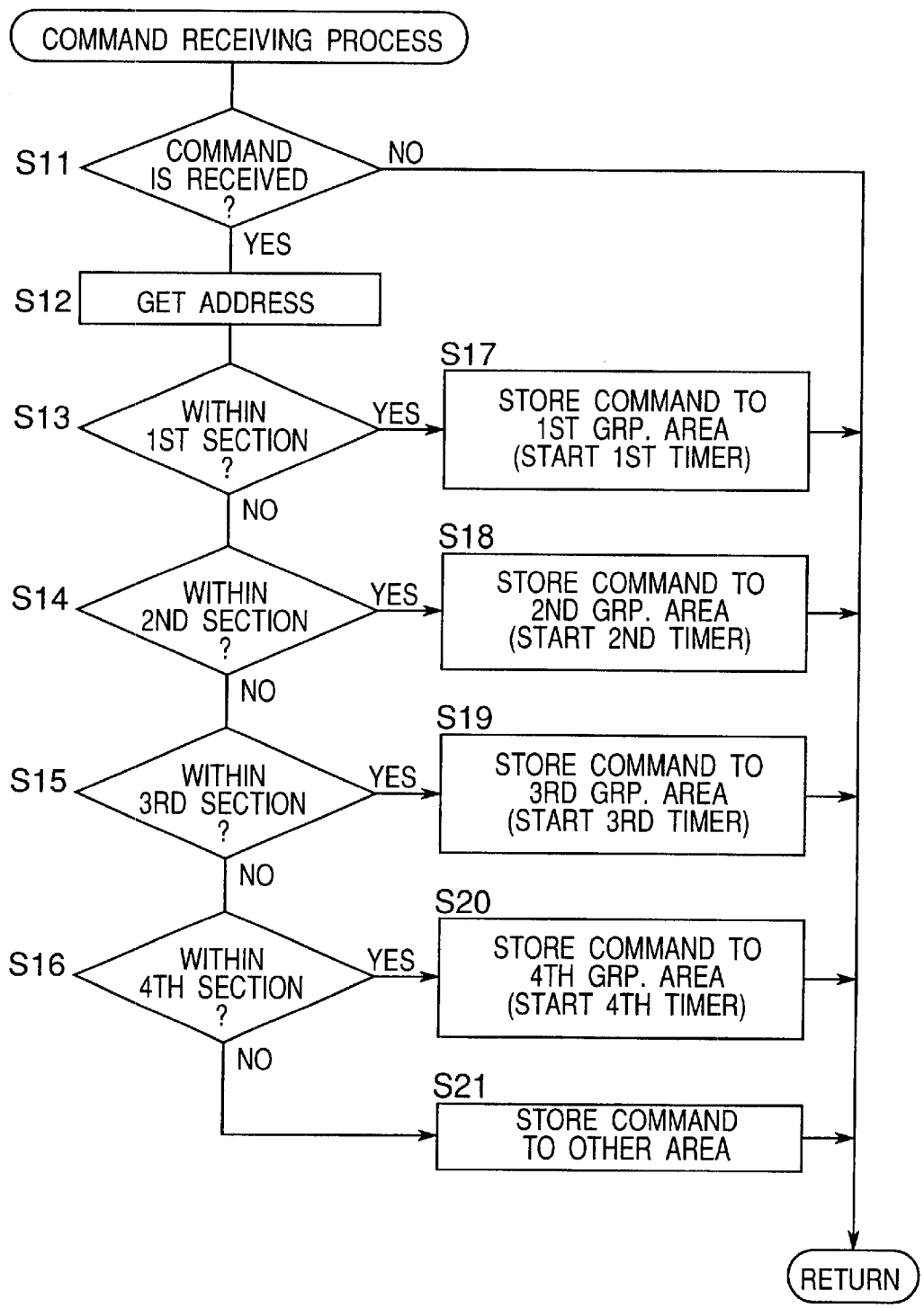
FIG. 8 is a flow chart of the command receiving process of the data server system according to the first preferred embodiment.

FIG. 8 is a flow chart of the command receiving process (S1). This process starts by determining whether there are any received commands (S11). When not, the command receiving process terminates. When there are, the address information is obtained from the received command (S12). The disk section 41, 42, 43 or 44 accessed by the received command is then determined based on this address information, and the command is then stored to the group area 213, 214, 215 or 216 corresponding to the accessed disk section 41, 42, 43 or 44.

Specifically, after reading the address information, the data server system determines whether the accessed address belongs to the first disk section 41 (S13). When the address belongs to the disk section 41, the received command is stored to first group area 213 of memory 22, that is, the area of memory 22 corresponding to first disk section 41 (S17). The first group area 213 can store a plurality of commands as described above. In the case that the received command is a write command, write data is also received. In this case the write data is stored to write data area 217 in memory 22 together with the command tag. A first timer is then started after the received command is stored. This first timer is used for measuring "a process delay time", that is, the period from when the command accessing first disk section 41 is first stored until the commands are executed. Note that this first timer operates continuously once it is started until at least one of the unprocessed commands for accessing first disk section 41 is run, that is, the timer is not reset every time a command accessing first disk section 41 is stored.

When the address does not belong to the first disk section 41, the data server system 20 determines whether the received command accesses the second disk section 42 (S14). When it does, the received command is stored to second group area 214, that is, the area in memory 22 corresponding to second disk section 42 (S18), and a second timer is started. This second timer operates in the same manner as the above-noted first timer, that is, it operates continuously once it is started until at least one of the unprocessed commands for accessing second disk section 42 is run. That is, the timer is not reset every time a further command accessing second disk section 42 is stored.

When the received command does not access the first and second disk section, it is determined whether the received command accesses the third disk section 43 (S15). When it does, the received command is stored to third group area 215 of memory 22, which corresponds to the third disk section 43 (S19), and a third timer is started. This third timer also operates in the same manner as the first and second timers.

When the received command does not access the first, second, and third disk sections, it is determined whether the received command accesses the fourth disk section 44 (S16). When it does, the received command is stored to fourth group area 216 of memory 22, which corresponds to the fourth disk section 44 (S20), and a fourth timer is started. This fourth timer also operates in the same manner as the above mentioned timers.

When the address does not belong to any of these disk sections 41–44, it is stored to a different area in the memory 22 (S21) and run. These commands are neither read nor write commands, and are processed with priority.

First, it is determined whether there is a command to be processed with priority (S31). When there is, the command is processed (S40), and then the command execution process ends.

When the command is not a priority command, it is determined whether a process time reaches the command execution time (S32). The command execution time is obtained from the predetermined reference time. When the process time does not reach the command execution time, the command execution process (S2) ends. When the process time reaches the command execution time, the next command execution time is set (S33). This next command execution time is obtained by adding the command execution period to the present command execution time.

This command execution period (time interval) is described further below. The command execution period is limited by the processing capacity of the data server system. The processing capacity of the data server system depends, for example, on the data compression method used. By using a command execution period, this data server system according to this preferred embodiment produces a delay between command receipt and execution. Therefore, the command execution period is preferably set as long as this delay allows, and can be determined by the following equation, for example;

$$\text{command execution period} = (\text{allowable delay} - \text{command processing time})/\text{number of disk sections} \quad (1)$$

where the allowable delay is the maximum delay between when a command is received and when it is processed; the command processing time is the time required between when a read command is sent and when the read data is output. For example, if a delay of up to 1 sec (second) is allowed before command processing with four disk sections, the command execution period is approximately 250 msec.

After step S33, it is determined whether there are unprocessed commands that have been waiting for more than a predetermined period (S34). This is determined by determining whether the process delay time measured by the first to fourth timers exceeds this specific period.

When there are unprocessed commands that have been waiting for longer than this predetermined period, the group area storing those unprocessed commands is selected as the "execution area" (S41). The timer for the selected group area is then stopped (S42), and commands in the selected execution area are processed (S39). This prevents command processing from being delayed longer than a predetermined period after the command is received.

When there are no commands that have not been processed for more than the specific period, each of the group areas 213 to 216 in memory 22 is checked for any unprocessed commands (S35). When there are no unprocessed commands, the command execution process S2 ends. When there are, the group area containing the most unprocessed commands is determined (S36), and then it is determined whether there are two or more group areas containing the most unprocessed commands (S37). When there is only one memory containing the most number of unprocessed commands, this group area is selected as the execution area (S38).

When there is more than one group area with this most number of unprocessed commands, out of those areas the disk section that is closest in distance on the hard disk drive 32 to the last-processed disk section is selected as the execution area (S43). As a result, the group area storing the most unprocessed commands is selected as the execution area at a particular command execution time.

Once the execution area has been selected, the commands stored therein are executed (S39). In the execution of the write command, the write data stored to the write data area 217 is written to the hard disk drive 32. In the execution of the read command, the data read from hard disk drive 32 is stored to the read data area 218 of memory 22, and a tag relating the read data with the read command requesting that data is assigned and also stored.

The command execution process of this preferred embodiment thus processes with priority those commands stored in the group area of memory 22 storing the most unprocessed commands at any particular command execution time. The process delay time is also simultaneously counted by the timer so that command processing is not delayed more than a predetermined time after the command is received. It should be noted that while an execution area is designated at each command execution time and the commands stored to that group area are then processed, it is alternatively possible to sequentially select group areas without waiting for a predetermined command execution period to elapse. In this case the next group area is selected and commands stored therein are processed when processing commands in one group area is completed.

FIGS. 10A–10F show one example of group area selection and command processing by means of a data server system described above. As shown in the figures, commands in the group area containing the most unprocessed commands are processed at each command execution time. At time T5, commands 4a to 4d for the fourth disk section 44 are processed. This is to ensure that the delay to processing command 4a does not exceed the predetermined process delay time.

Figure 11:
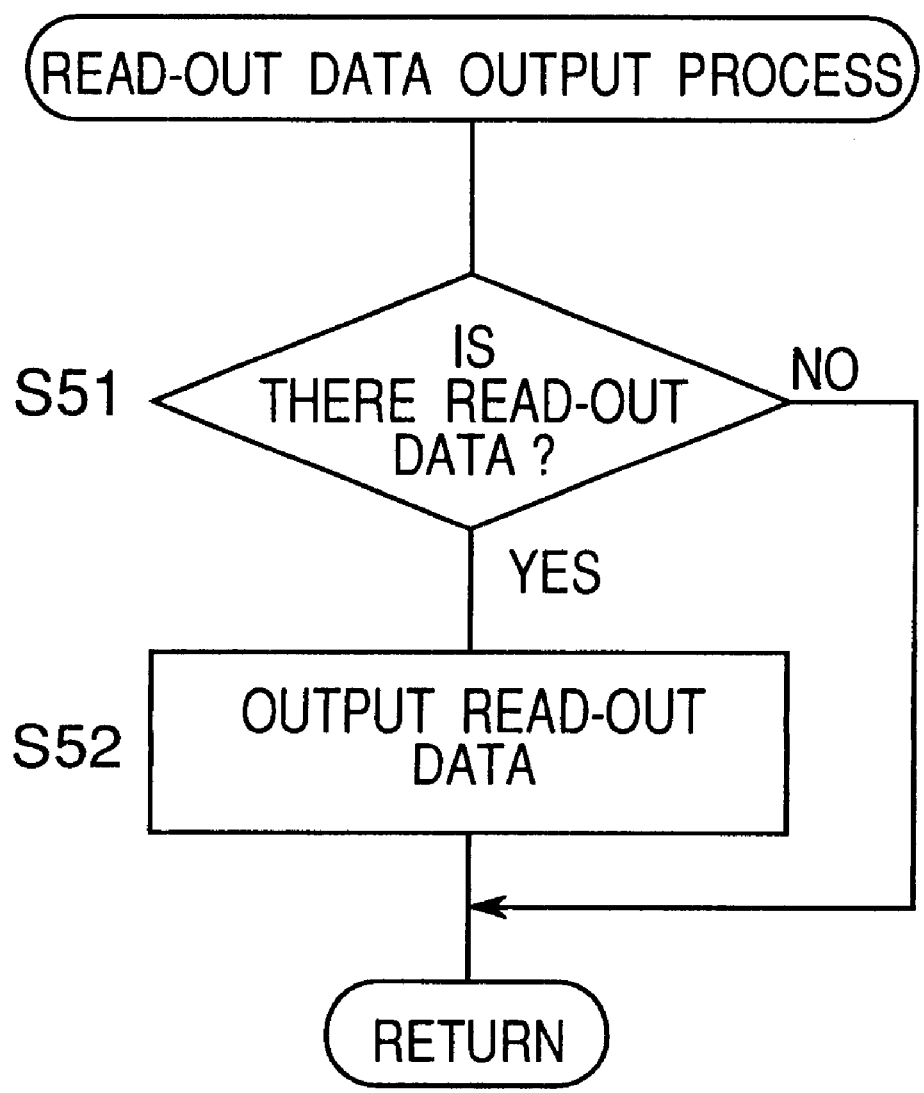
FIG. 11 is a flow chart of the read data output process of the data server system according to the first preferred embodiment.

FIG. 11 is a flow chart of the read data output process (S3) in this exemplary embodiment.

This process starts by determining whether there is any data read due to a read command stored in the read data area 218 of memory 22 (S51). When not, this process ends. When there is, the data is tagged as described above, and is then output to the requesting terminal (S52). The process then ends.

A data server system according to the related art as described above attempts to improve data throughput by receiving and storing a plurality of commands and processing the commands based on the convenience of the magnetic head position. The data server system according to the present invention, however, segments the storage area of the storage medium (a hard disk or magnetic disk in this exemplary embodiment) into a plurality of sections, groups the plurality of received commands according to the disk section accessed by the command, and consecutively processes commands associated with a particular disk section at predetermined time intervals. The read/write head to the storage medium thus travels less compared with the control method for a conventional data server system, and data throughput can be improved accordingly.

EMBODIMENT 2

Figure 9:
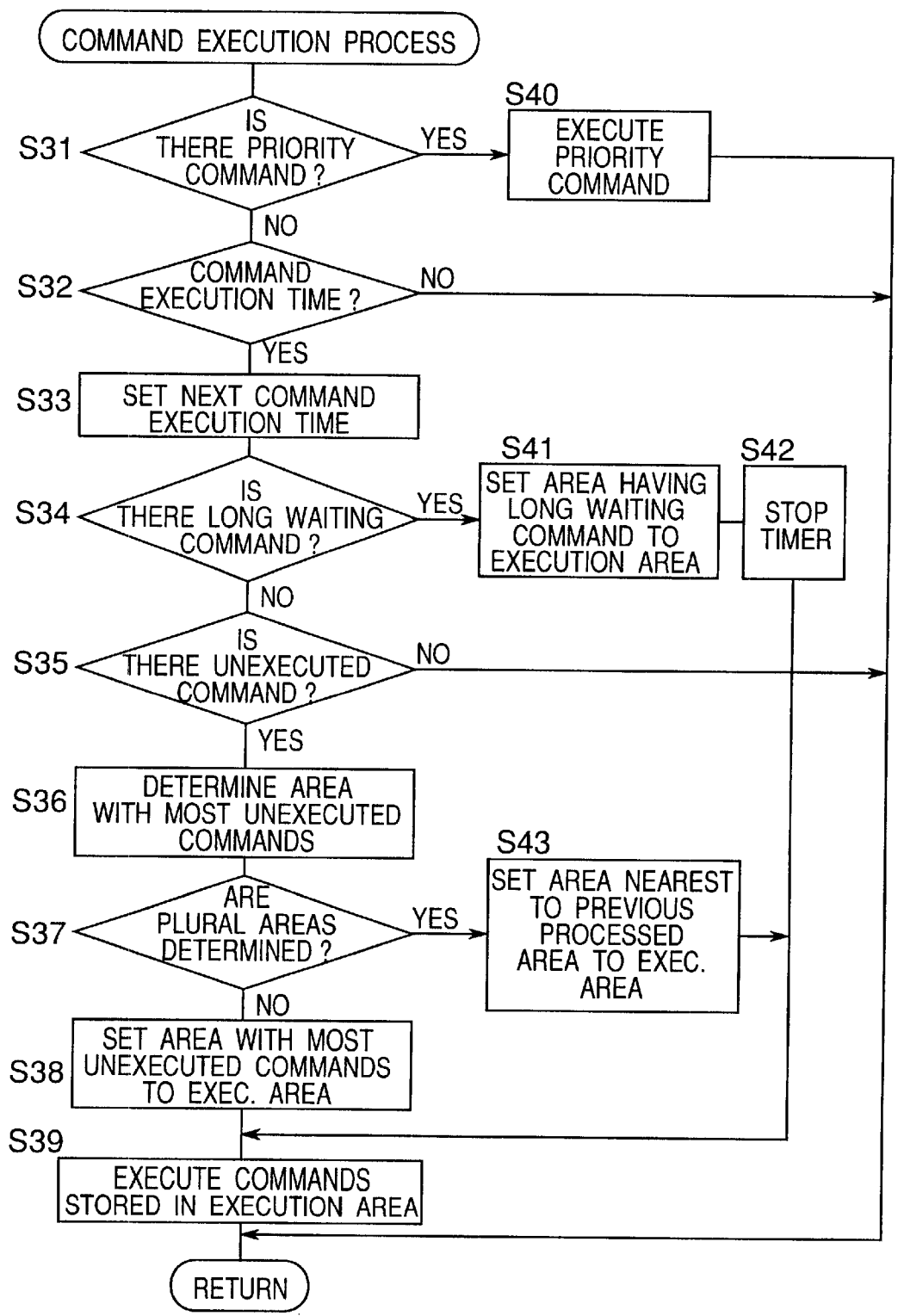
FIG. 9 is a flow chart of the command execution process of the data server system according to the first preferred embodiment.
Figure 10:
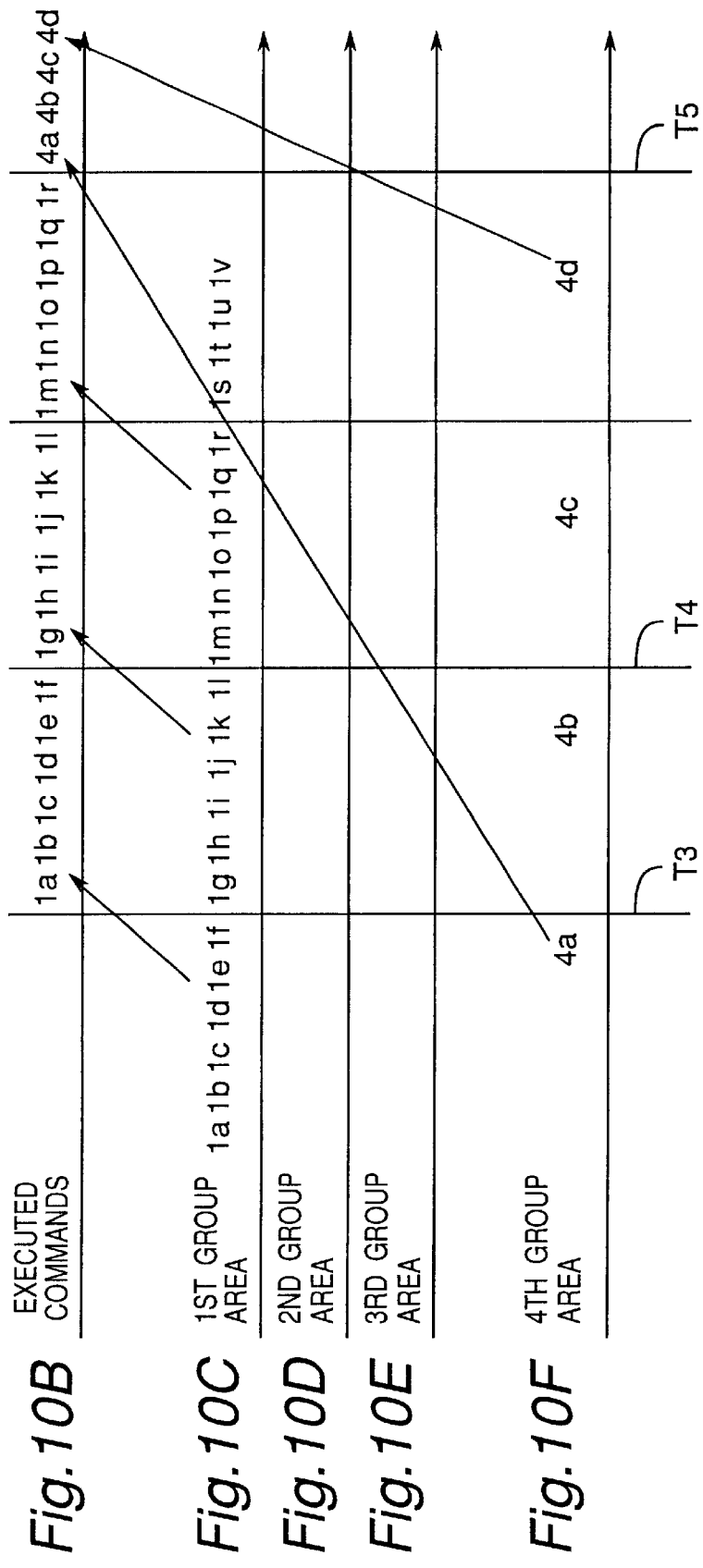
FIGS. 10A–10F are diagrams which describe an example of the sequence in which received commands are processed in the data server system according to the first preferred embodiment.

The command execution process in the first embodiment (see FIG. 9) selects the group area containing the most unprocessed commands at a particular command execution time as the execution area. The command execution process of this second embodiment, however, processes commands from the first to fourth group areas in simple sequential order, that is, first group area, second group area, third group area, fourth group area, then first group area, and so forth.

Figure 12:
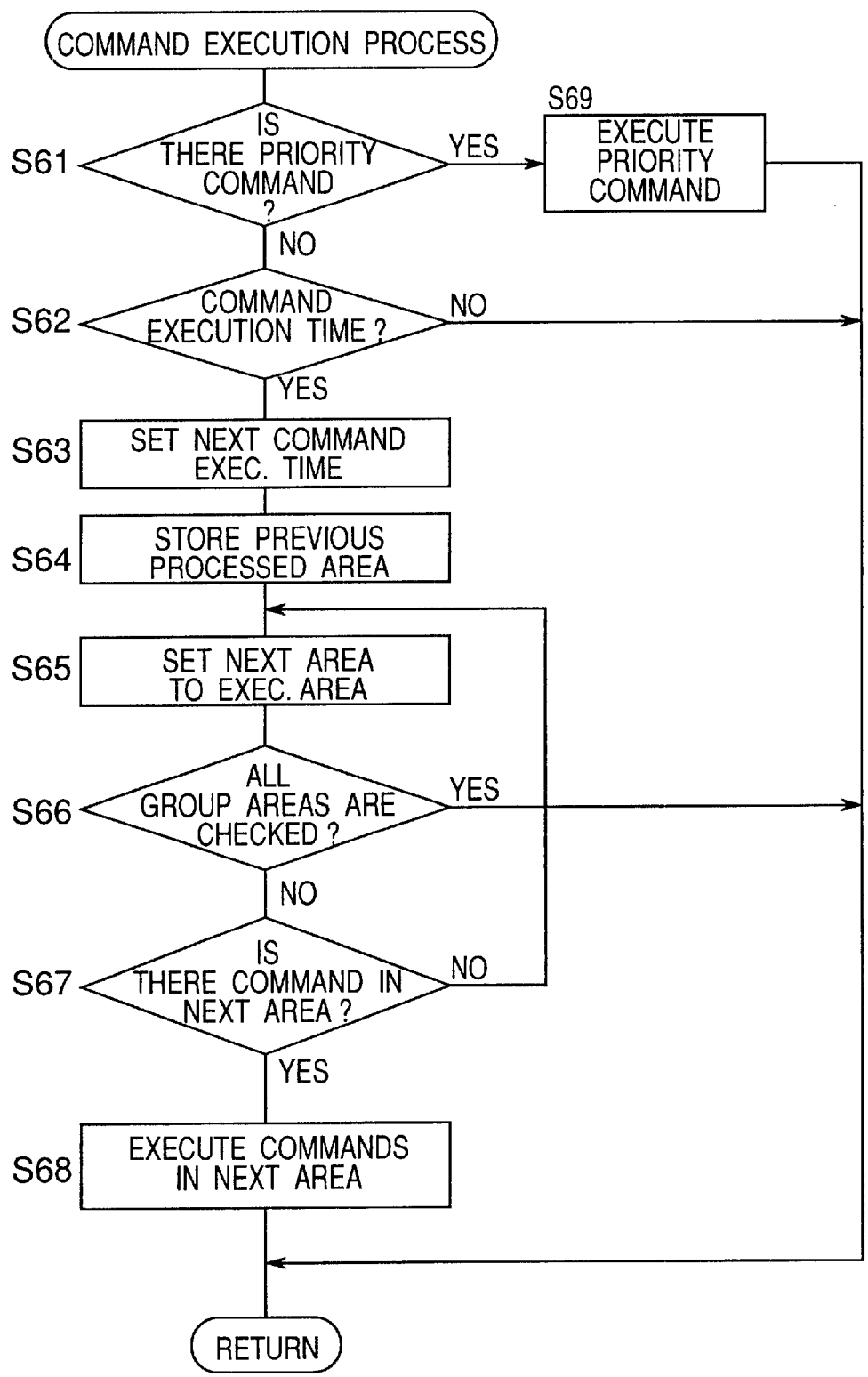
FIG. 12 is a flow chart of the command execution process of the data server system according to a second preferred embodiment.

FIG. 12 shows a flow chart of command execution process of this second embodiment. As shown this figure, it is first determined whether there is a command to be processed with priority (S61). When there is, the command is processed (S69), and the command execution process ends.

When there is not a priority command to process, it is determined whether the process time reaches a command execution time (S62). When the process time does not reach the command execution time, the process ends. When the process time reaches the command execution time, the next command execution time is set (S63).

A value indicative of the previous execution area is then stored as a current area counter (S64). A next area counter is then set by adding 1 to the current area counter (S65). Note that when the value for the next area counter exceeds the highest counter value (4, which is number of sections on the disk, in the example shown in FIG. 3), the next area counter is reset to 1. It is then determined whether all group areas 213–216 are checked (S66). When commands in all group areas 213–216 have been checked, this command execution process ends. When not, it is determined whether there are any unprocessed commands in the area specified by the next area counter (S67). When there are no unprocessed commands, control loops back to step S65 and the next area counter is incremented as above. When there are unprocessed commands in the area specified by the next area counter, commands in the area are executed (S68), and then the process ends.

As does the data server system according to the first embodiment, the data server system according to this preferred embodiment reduces the amount of head travel compared with the data server system according to the related art, and thereby improves data throughput.

It should be noted that if the number of commands grouped in a particular group area exceeds the number of commands that can be processed within a single command execution period, remaining commands in that same group area can be prioritized for processing in the next command execution period. As a result, AV information that is stored continuously to a particular disk section and is frequently accessed can be read and reproduced without interruption by prioritizing reading from that disk section.

EMBODIMENT 3

A data server system according to this preferred embodiment groups received commands according to the section of the hard disk drive accessed by the command, stores the commands to memory 22 by command group, and processes commands stored to the same area in memory 22 at each command execution time interval. This is the same as in the above first and second embodiments of the invention.

Additionally, however, a data server system of this embodiment predicts what command will be received next based on the contiguity of sequential access addresses in the case that: a plurality of consecutively received commands are read commands; the commands indicate sequential access addresses; and the number of received commands does not exceed the number of commands that can be processed within a single command execution period. The predicted commands are then processed consecutively to the received commands. This method is particularly effective when the data to be processed is AV information, that is, when there is a large amount of time-dependent information to be processed, because head travel over the hard disk can be minimized and the time consumed by wasted movement can be reduced.

The following description will be done in the case that up to five commands can be processed within a single command execution period, and these commands are received in the sequence 1a, 4a, 1b, 4b . . . , as shown in FIG. 13A. In addition, these commands access sequential addresses, i.e., indicate sequential access. As described above, the received commands are grouped by the disk section accessed, and stored by the command group to a specific area in the memory 22.

At the command execution time T1', commands 1a, 1b and 1c are stored to the first group area 213 in the memory 22, and are therefore processed. Because up to five commands can be processed in a single command execution period, however, it can afford to execute more commands in this period. The next two commands to be processed are therefore predicted and processed.

More specifically, commands 1a, 1b and 1c access sequential addresses, and it is logical to predict that commands 1d and 1e are to follow the command 1c. As a result, predicted commands 1d and 1e are processed following the three actually received commands 1a, 1b and 1c.

The data read based on a predicted command is stored to a specific area in the memory 22, and is output to the external device or the computer that sent the data request when the command matching the predicted command is actually received. When a command matching the predicted command is not received within a predetermined period of time, the data read for the predicted command is abandoned.

Figure 13:
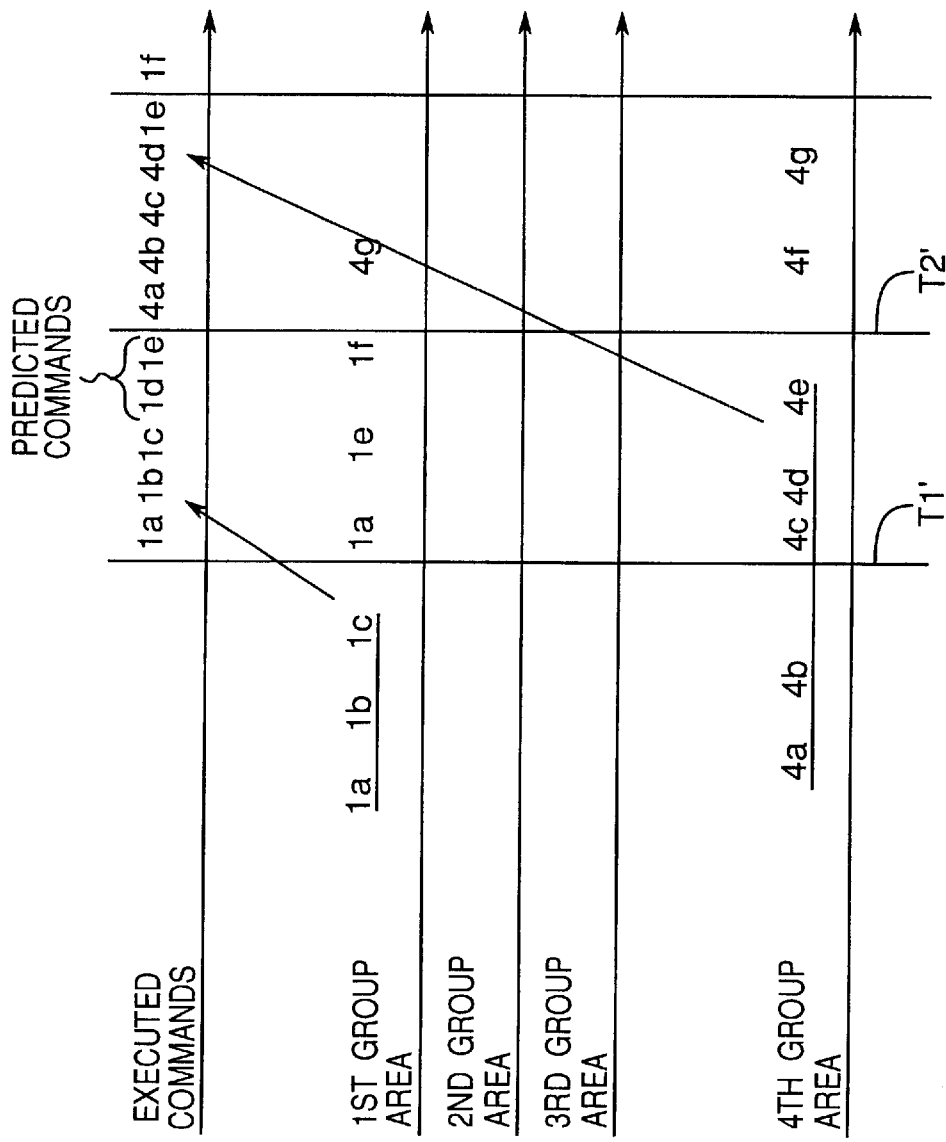
FIGS. 13A–13F are diagrams which describe processing received commands and predicted commands in the data server system according to a second preferred embodiment.

At time T2' in FIG. 13, the commands stored for fourth group area 216 are processed. In this case, however, there are five commands 4a–4e stored for the fourth group area 216. This equals the maximum number of commands that can be processed within a single command execution period. There is no remaining processing capacity in that command execution period, and command prediction is therefore skipped.

In other words, a data server system according to this preferred embodiment detects whether sequential access continues for a predetermined period, or more specifically detects whether the information specified by a plurality of commands resides at sequential addresses on the disk. When sequential access is thus detected to continue, the data is confirmed to be sequential access data. The command accessing the next data block stored contiguously to the end of the last sequentially accessed block is then predicted, and the predicted command is processed. This is possible because the data is accessed sequentially. The data read sequentially by the predicted command is then stored to the memory 22, and is passed to the requesting terminal when the matching command is actually received.

By thus performing a task before actually requested, sequentially accessed data can be processed and transmitted with greater effective throughput. This is particularly advantageous when handling AV information. That is, by continuing to read AV information continuously and without interruption, head travel between access tasks can be reduced, and data throughput can be increased.

Figure 14:
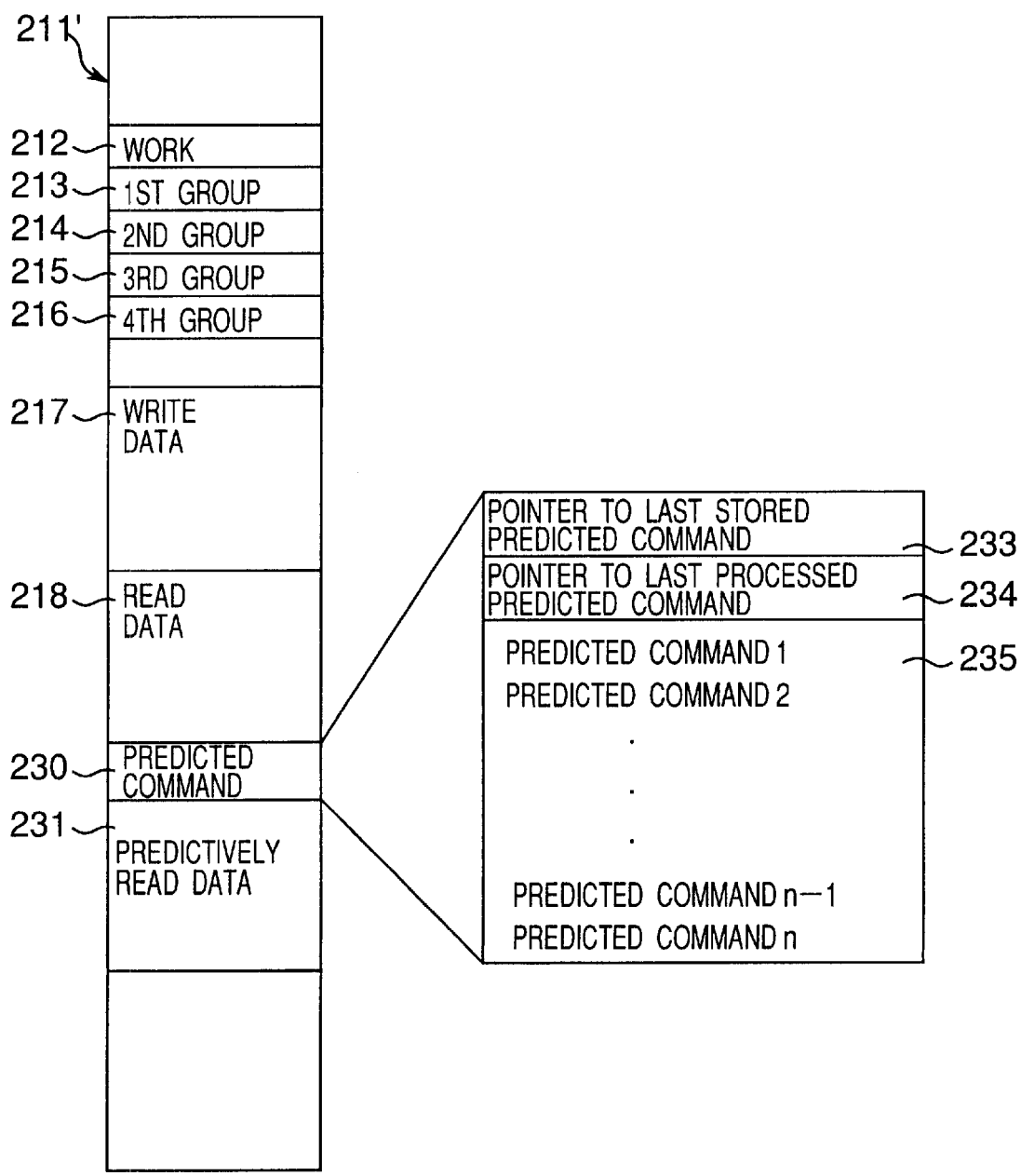
FIG. 14 is a diagram that describes the memory space, particularly the predicted command storage area, of the memory in the data server system according to the second preferred embodiment.
Figure 15:
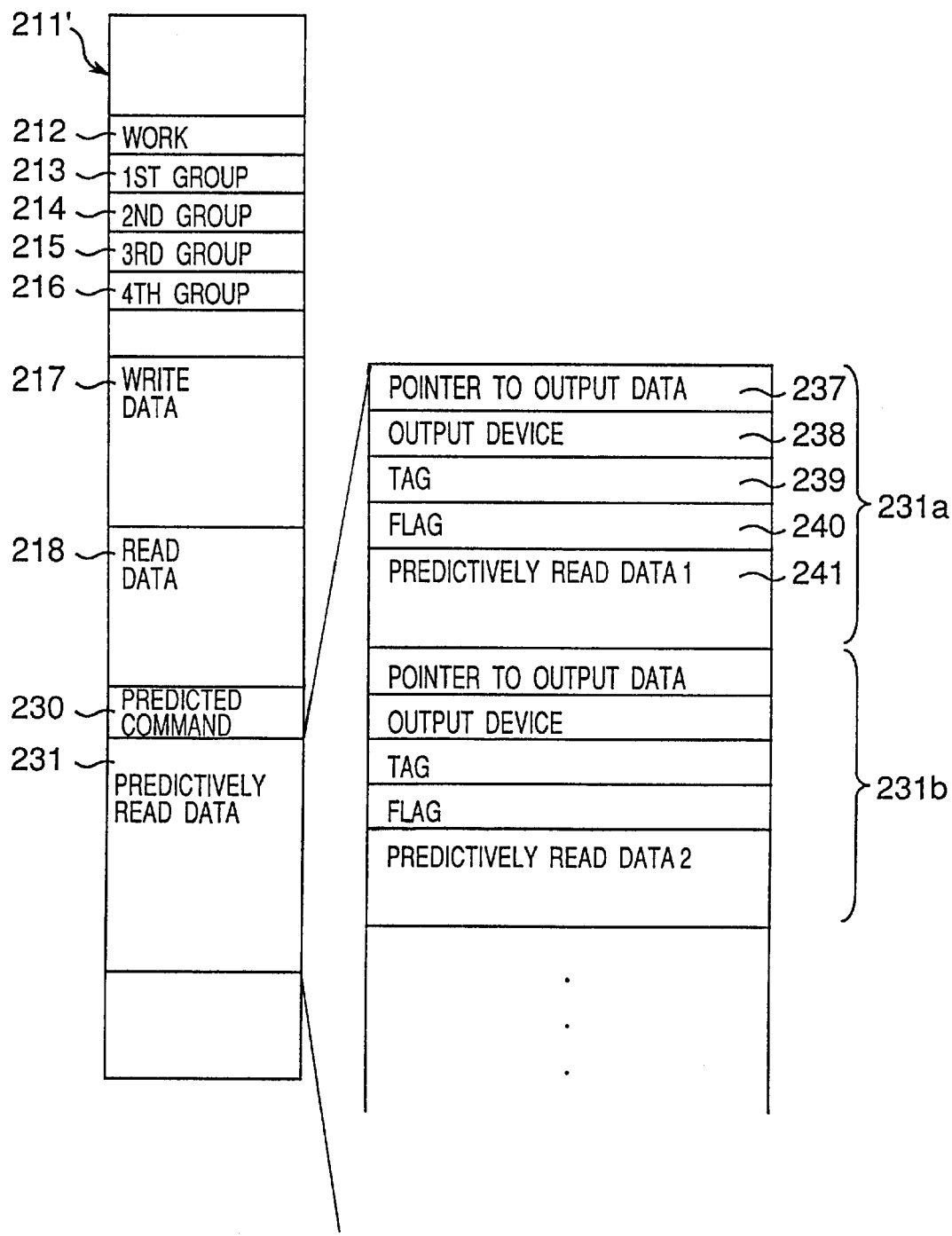
FIG. 15 is a diagram that describes the memory space, particularly the predictive read data storage area, of the memory in the data server system according to the second preferred embodiment.

FIGS. 14 and 15 show a memory map for memory 22 in a data server system according to this preferred embodiment. As shown in these figures, memory space 211' is substantially identical to the memory space 211 shown in FIG. 5, additionally comprising an area 230 for storing predicted commands, and an area 231 for storing data read according to the predicted commands.

The predicted command area 230 is further segmented into a plurality of areas 233–235. The area 235 stores the predicted commands. The area 233 stores a pointer to the address of the last command written to the predicted command area 235. The area 234 stores a pointer to the address of the command processed last in the predicted command area 235. It is therefore possible to determine whether a particular command has been processed by referencing these pointers.

As shown in FIG. 15, the predictive read data area 231 is further segmented into a plurality of areas 231a, 231b and so on. Each area corresponds to a single predicted command. It is necessary to provide an area 231a, 231b, . . . in the predictive read data area 231 for storing data for each of the predicted commands because all of read data by the prediction may not be output. It is therefore not possible to uniformly manage predictive data output, and it is necessary to manage data output separately for each predicted command.

Each of the plural areas 231a, 231b, . . . is further segmented into a plurality of areas 237–241.

The area 241 is for storing the data read based on a predicted command. The area 237 stores a pointer to the address of the data read last in response to a predicted command. The area 238 stores a pointer to the address of the last-output data which is obtained by the prediction. The area 239 stores the tag as described above. The area 240 stores a flag indicating state of predicted data.

The operation of a data server system according to this preferred embodiment is described. Note that the main loop routine of this preferred embodiment is the same as that shown in FIG. 7. The individual routines within this main loop are therefore described below.

Figure 16:
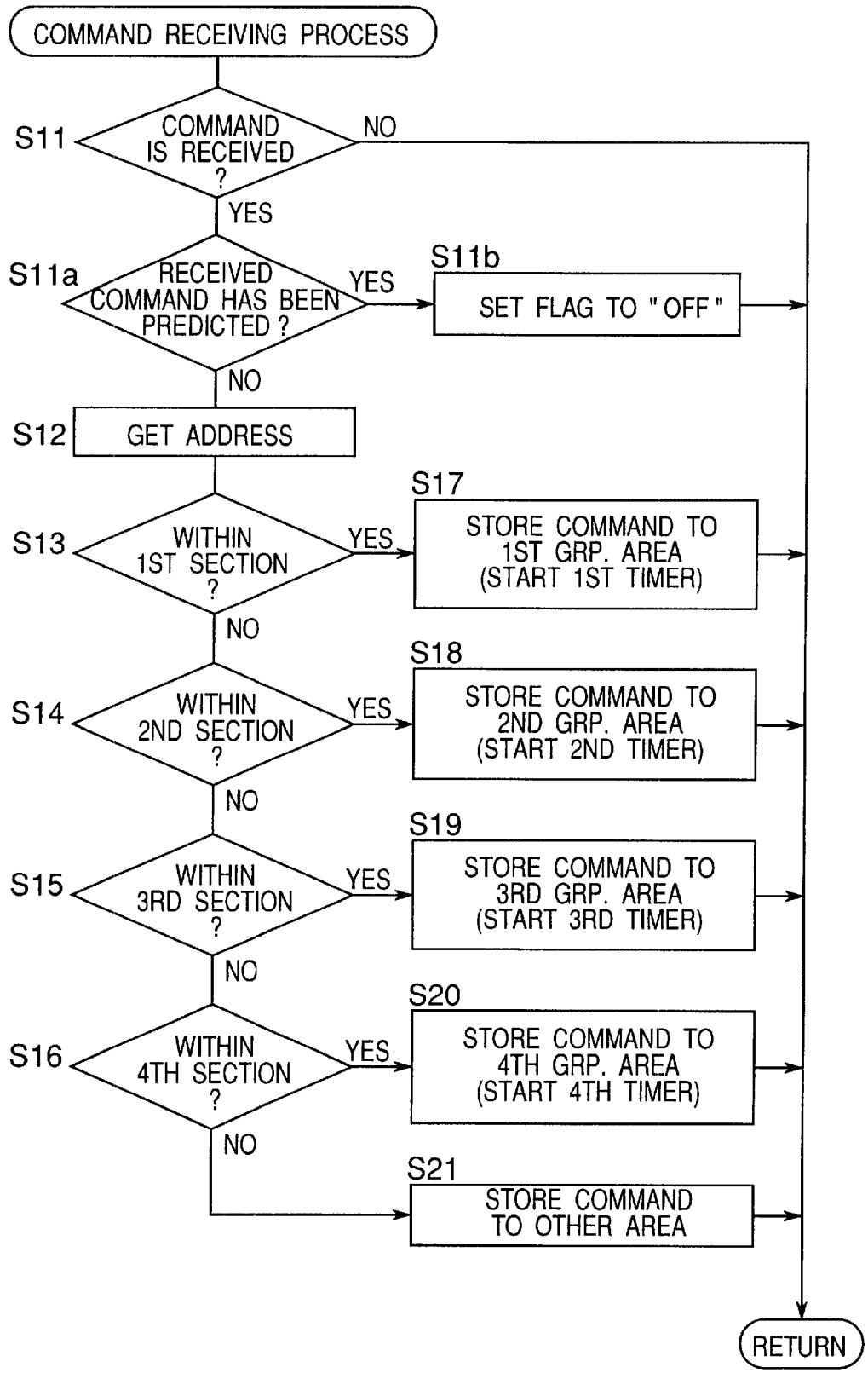
FIG. 16 is a flow chart of the command receiving process in the data server system according to a third preferred embodiment of the present invention.

FIG. 16 is a flow chart of the command receiving process in the data server system according to this preferred embodiment. This command receiving process differs from that in FIG. 8 in that additional steps S11a and S11b are inserted between steps S11 and S12 in FIG. 8. More specifically, after detecting a received command in step S11, it is determined whether the received command matches a predicted command (S11a). When it does, the predictive command flag is turned off (S11b), and the process ends. When the received command does not match a predicted command, the process advances to step S12. All other steps are same as shown in FIG. 8.

Figure 17:
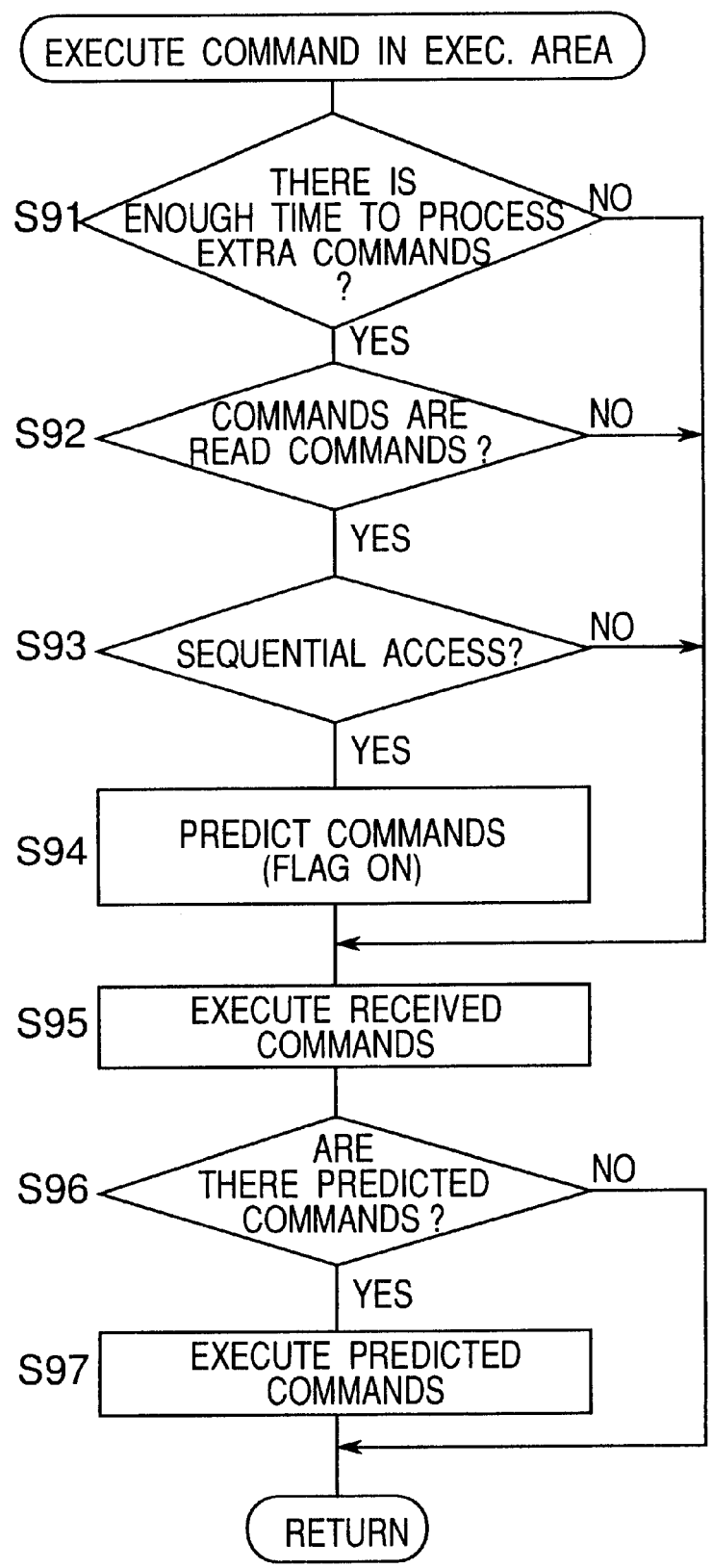
FIG. 17 is a flow chart of the execution process of command stored in the execution group are in the data server system according to a third preferred embodiment of the present invention.

The command execution process according to this preferred embodiment is described next. This command execution process is substantially identical to that shown in FIG. 9, differing in the method performed as step S39 to process commands in the execution area. This method of processing commands according to this preferred embodiment is described further below with reference to FIG. 17.

First, it is determined whether capacity is available to process additional commands (S91). That is, the number of commands that can be processed within a single command execution period is determined in advance based on the capacity of the disk drive, and when the number of commands stored in the group area selected as the execution area is less than this number of processable commands, the capacity is decided to be available.

When there is not capacity available, the procedure advances to step S95. When there is capacity available, it is decided whether the command to be processed is a read command (S92). When it is, it is determined whether the commands indicate sequential access (S93). Determination of sequential access is done as follows.

As shown in FIG. 3A, each command contains both an address 103 and data size 104 (data transfer size). For example, when commands 1a and 1b are consecutive, the following relationship exists;

address specified by command 1a+data size of command 1a=address specified by command 1b (2).

The equation (2) makes it possible to decide whether commands are consecutive (sequential). Likewise, whether commands 1c and 1b are consecutive can be determined based on the following equation;

address specified by command 1c=address specified by command 1b+data size of command 1b (3).

It is therefore possible by applying the above equations to predict the start address of the data addressed by the next command in sequence.

When the commands to be processed do not access sequential addresses, the process skips forward to step S95. When the commands are sequential, the command to be processed after the received command to be processed last is predicted and issued (S94). Note that predicted commands are sequential to received commands. The predicted command flag is added to each predicted command, and is set "on".

All commands in the selected execution area are then processed (S95). It is then determined whether there are any predicted commands posted (S96). When there are predicted commands, those commands are processed (S97). Commands processed in steps S95 and S97 result in data being read from hard disk drive 32 and stored to a specific area in memory 22. Data read from hard disk drive 32 into memory 22 is then output to the requesting terminal in the read data output process shown below.

Figure 18:
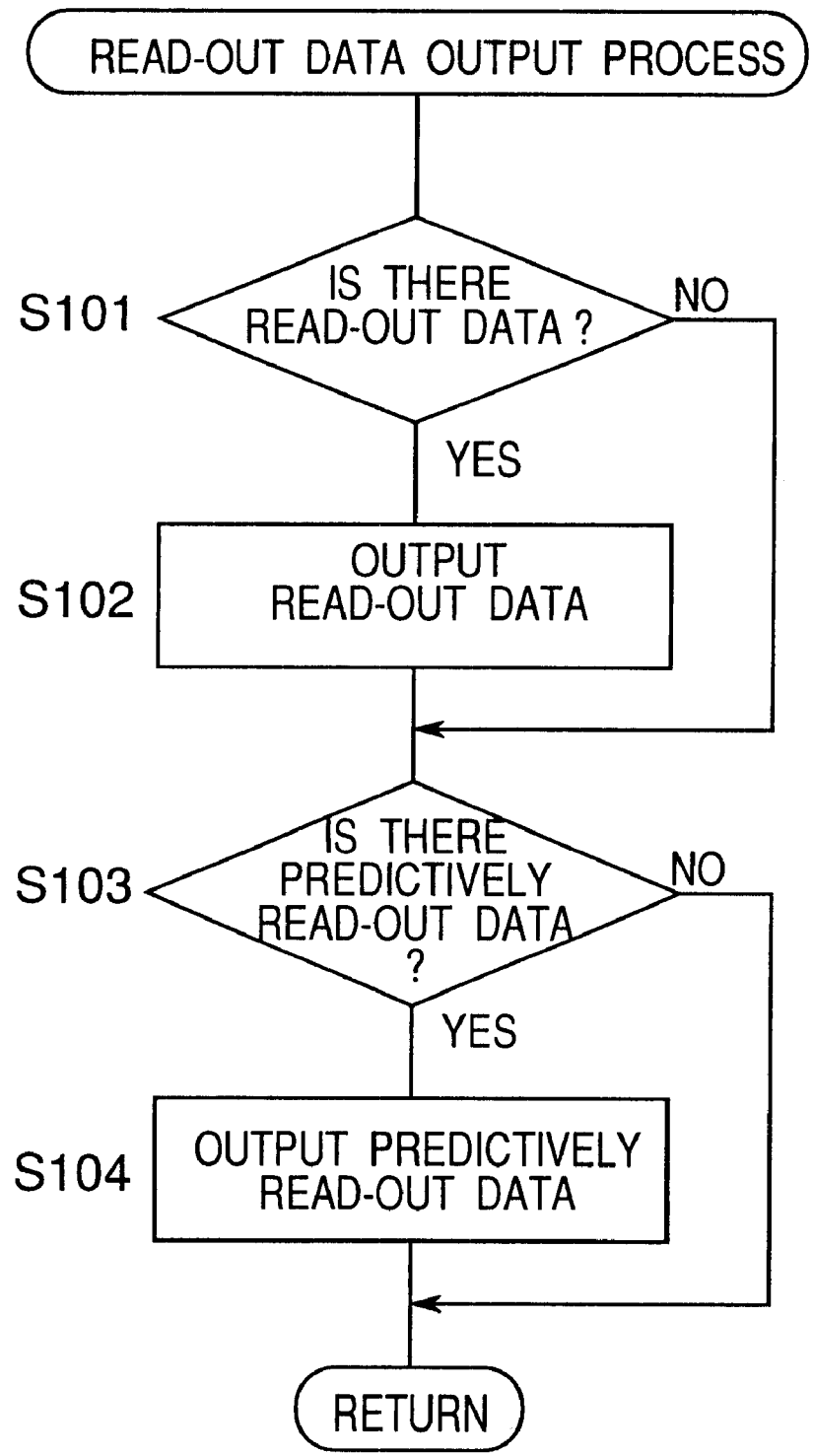
FIG. 18 is a flow chart of the read data output process in the data server system according to a third preferred embodiment of the present invention.

FIG. 18 shows a flow chart of an exemplary read data output process according to this preferred embodiment.

The first step is to determine whether there is any data read from the memory 22 in response to the received read command (S101). When there is not, the procedure advances to step S103. When there is, a tag is added to the read data and the tagged read data is output to the requesting terminal (S102).

Then it is determined whether there is any predictively read data in predictive read data area 231, and whether there is a predicted command with the predicted command flag of "off" (S103). By thus checking the predictive data flag, predictively read data is only output after a read command is received matching the predicted command whereby the data was read. Therefore, when there is predictively read data in predictive read data area 231, and there is a predicted command of which the predicted command flag is "off", the predictively read data is output to the terminal requesting the data (S104), and the process ends.

As described above, received commands are grouped and processed not in the sequence received, but by the area of the disk accessed by the command in a data server system according to these preferred embodiments. By thus batch processing commands accessing substantially adjacent areas, read/write head movement is less, and data throughput is greater, than when the data storage area of a hard disk (magnetic disk) is randomly accessed.

It will be obvious to one with ordinary skill in the related art that the present invention shall not be limited to use with magnetic disk media. More specifically, the present invention can be applied with any type of media drive for recording data to a recording medium with a recording area to which data can be recorded and from which data can be reproduced.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A data storage apparatus for storing data to a data recording medium having a plurality of predetermined data sections provided thereon, the data storage apparatus being operable to receive commands through a communication device from external devices, to record to the data recording medium data received with a command when the received command is a write command, and when the received command is a read command, to read information from the data recording medium according to the read command and to output the data through the communication device, said apparatus comprising:
 a command storing device operable to group received commands according to the data section on the data recording medium accessed by each command, and to store the received commands to a predetermined command group area according to the group; and
 a command executing device operable to select, at a predetermined time interval, one of the command group areas in said command storing device, and to execute at least one of the commands stored in the selected command group area.

2. The data storage apparatus according to claim 1, wherein said command executing device is operable to select the command group area storing the most number of 25 unexecuted commands, as the one selected command group area.

3. The data storage apparatus according to claim 1, wherein said command executing device is operable to select one of the command group areas in the command storing device in a predetermined sequence.

4. The data storage apparatus according to claim 1, wherein said command executing device comprises a detection device and a command predicting device,
 wherein said detection device is operable to detect whether data specified by a plurality of read commands is stored to sequential recording areas on the data recording medium when commands stored to the selected command group area are read commands,
 wherein said command predicting device is operable to predict a command for reading out data from a data recording area on the data recording medium when said detection device determines that sequential recording areas are accessed by the read commands, the data recording area being sequential to areas accessed by commands stored in the selected command group area, and
 wherein the predicted command is processed consecutively with respect to commands contained in the selected command group area.

5. The data storage apparatus according to claim 1, wherein the data recording medium is a magnetic disk.

6. A method for controlling a data storage apparatus for storing data to a data recording medium having a plurality of predetermined data sections provided thereon, the data storage apparatus being operable to receive commands through a communication device from external devices, to record to the data recording medium data received with a command when the received command is a write command, and when the received command is a read command, to read information from the data recording medium according to the read command and to output the data through the communication device, said method comprising:
 grouping received commands according to the data section on the data recording medium accessed by each command;
 storing the received commands to a predetermined command group area according to the group;
 selecting, at a predetermined time interval, one of the command group areas; and
 executing at least one of commands stored in the selected command group area.

7. The method according to claim 6, wherein said selecting comprises selecting the command group area storing the most number of unexecuted commands as the one selected command group area.

8. The method according to claim 6, wherein said selecting comprises selecting the one of the command group areas in a the predetermined sequence.

9. The method according to claim 6, wherein said executing comprises detecting and predicting,
 wherein said detecting comprises detecting whether data specified by a plurality of read commands is stored to sequential recording areas on the data recording medium when commands stored to the selected command group area are read commands,
 wherein said predicting comprises predicting a command for reading out data from a data recording area on the data recording medium when it is determined that sequential recording areas are accessed by the read commands, the data recording area being sequential to areas accessed by commands stored in the selected command group area, and
 wherein the predicted command is processed consecutively with respect to commands contained in the selected command group area.

10. The method according to claim 6, wherein the data recording medium is a magnetic disk.

* * * * *

UNITED STATES PATENT AND TRADEMARK OFFICE
CERTIFICATE OF CORRECTION

PATENT NO. : 6,567,862 B1
DATED : May 20, 2003
INVENTOR(S) : Kenji Saito

It is certified that error appears in the above-identified patent and that said Letters Patent is hereby corrected as shown below:

<u>Title page,</u>
Item [75], Inventor, change "Kenji Saito, Kantano (JP)" to -- Kenji Saito, Katano (JP) --.

<u>Column 16,</u>
Line 45, delete "the" after "a".

Signed and Sealed this

Thirteenth Day of January, 2004

JON W. DUDAS
*Acting Director of the United States Patent and Trademark Office*